United States Patent [19]
Fisher et al.

[11] Patent Number: 5,651,949
[45] Date of Patent: *Jul. 29, 1997

[54] PRODUCTION OF BORIC OXIDE

[75] Inventors: Richard P. Fisher, Hesperia, Calif.; John D. Kwamya, Danbury, Conn.; Tracy E. Gray, Victorville, Calif.

[73] Assignee: U.S. Borax Inc., Valencia, Calif.

[*] Notice: The term of this patent shall not extend beyond the expiration date of Pat. No. 5,424,052.

[21] Appl. No.: 611,929

[22] Filed: Mar. 6, 1996

Related U.S. Application Data

[63] Continuation-in-part of Ser. No. 432,489, May 1, 1995, abandoned, which is a continuation-in-part of Ser. No. 157,755, Nov. 24, 1993, Pat. No. 5,424,052.

[51] Int. Cl.$^6$ .................................................. C01B 35/10
[52] U.S. Cl. ............................................. 423/278; 501/49
[58] Field of Search ................................ 501/49; 423/278

[56] References Cited

U.S. PATENT DOCUMENTS

| | | |
|---|---|---|
| 2,137,058 | 11/1938 | McCulloch . |
| 2,186,257 | 1/1940 | McCulloch . |
| 2,893,838 | 7/1959 | Stern et al. . |
| 3,397,954 | 8/1968 | Russell et al. . |
| 3,479,137 | 11/1969 | Campbell, Jr. et al. ................. 501/49 |
| 3,582,272 | 6/1971 | Stanton .................... 423/278 |
| 4,243,423 | 1/1981 | Hohman ...................... 501/29 |
| 4,908,196 | 3/1990 | Vasconi et al. . |
| 5,194,337 | 3/1993 | Yoshida et al. ........................... 501/49 |

FOREIGN PATENT DOCUMENTS

| | | |
|---|---|---|
| 1278466 | of 1972 | United Kingdom . |
| 2192625 | of 1988 | United Kingdom . |

OTHER PUBLICATIONS

Kirk–Othmer, Encyclopedia of Chemical Technology, Fourth Edition, vol. 4, p. 370 (1992).
Supplement to Mellor's Comprehensive Treatise on Inorganic and Theoretical Chemistry, vol. V, Part A, pp. 171–174 (1980).
Kemp, The Chemistry of Borates, Part I, pp. 6–11 (1956).
Larderello, Chemical Abstracts, vol. 47, p. 4563 (1953).

*Primary Examiner*—Wayne A. Langel
*Attorney, Agent, or Firm*—James R. Thornton

[57] ABSTRACT

Amorphous boric oxide-containing product having about 80 to 90% $B_2O_3$ is produced by heating boric acid to an elevated temperature of about 180° to 220° C. to dehydrate the boric acid and form a molten glass which is cooled to a solid glassy product. The solid glass can be comminuted to produce a particulate product. Preferably the boric acid is heated at about 195° to 205° C. The process is readily adapted to a continuous process in which the boric acid is continuously fed through a heated reactor-mixer such as a Kneadermaster mixer or Discotherm mixer. The molten glassy product is cooled to form a solid glassy product which can be comminuted to a desirable particle size range.

20 Claims, No Drawings

PRODUCTION OF BORIC OXIDE

This application is a continuation-in-part of our application Ser. No. 08/432,489, filed May 1, 1995, now abandoned, which, in turn, was a continuation-in-part of application Ser. No. 08/157,755, filed Nov. 24, 1993 by Paul F. Jacobs, Jacob J. Mu and Richard P. Fisher, now U.S. Pat. No. 5,424,052, and assigned to the assignee of the present application.

This invention relates to boric oxide and more particularly, it relates to the production of an amorphous boric oxide product having about 80 to 90% $B_2O_3$.

BACKGROUND OF THE INVENTION

Boric oxide has many industrial applications, especially in the glass-making field where it is desirable to have a source of $B_2O_3$ without the undesirable presence of sodium, such as is contributed by borax, or excess water to evaporate, such as from boric acid. Boric oxide is generally produced on an industrial scale by the dehydration of boric acid at high temperatures such as in the range of about 700°–950° C. in a glass furnace fired by oil or gas. The molten glass is solidified by allowing a continuous ribbon to flow over chill rolls and then crushed and screened to the desired particle size. See Kirk-Othmer, "Encyclopedia of Chemical Technology" Fourth Edition, Volume 4, Page 370, and U.S. Pat. No. 2,893,838. The product is a high purity (99% $B_2O_3$) amorphous solid, but it has the disadvantage of being hygroscopic, tending to rehydrate and cake under normal use and storage conditions. Further, it is expensive to manufacture due to the energy required to maintain the furnace at the required high temperatures. A lower $B_2O_3$ content product has been manufactured by reacting borax with sulfuric acid and then feeding the resultant mixture to a gas-fired furnace operating at 800°–900° C. The resultant amorphous product has a 95–98% $B_2O_3$ content but also contains residual sodium, which is undesirable in many glass-making applications. The process also has high energy requirements which make the product expensive to produce. See Supplement to Mellor's Comprehensive Treatise on Inorganic and Theoretical Chemistry, Volume V, Part A, Pages 171–174, U.S. Pat. No. 3,468,627 and U.S. Pat. No. 3,479,137.

High-purity, crystalline boric oxide has also been produced such as by the slow dehydration of boric acid in an oven at 225°–250° C. over a period of from 7 to about 14 days. The use of sub-atmospheric pressures or organic liquid carriers have also been suggested. See U.S. Pat. Nos. 2,137,058, 2,186,257, 3,397,954, 3,582,272 and 4,098,196, Italian Patent 467,440 [Chemical Abstracts 47,4563 (1953)], as well as the Kirk-Othmer and Mellor references discussed above, and Kemp, "The Chemistry of Borates," Part 1, Pages 10–11 (1956).

British Patent 1,278,466 describes a process for preparing a granulated boric oxide by heating granulated ortho-boric acid in a gas diffusion apparatus, such as a porous plate through which is passed a stream of hot air, forming a fluidized bed. The product is a granulated boric oxide having a $B_2O_3$ content approaching 98%.

Stanton U.S. Pat. No. 3,582,272 describes preparation of crystalline hexagonal boric oxide from boric acid in a heated dryer-agitator on a seed bed of crystalline boric oxide.

DESCRIPTION OF THE INVENTION

The present invention provides a method for producing a boric oxide-containing product having about 80–90% by weight $B_2O_3$. The method requires relatively low temperatures, thereby resulting in a substantial reduction in energy costs. It is readily adapted to a continuous process which will produce a highly useful boric oxide-containing product on a continuous basis without the necessity of specialized equipment to withstand high temperatures or long residence times in the reaction zone.

The product is a stable, solid glass which can be comminuted to a desirable particle size by conventional methods such as crushing and grinding. It is highly amorphous and non-porous, essentially free of sodium and is purer than many other commercially available dehydrated boric acid products. Since it is less hygroscopic than such commercial products it also has less tendency to cake. The energy savings achieved in producing the present product at the lower temperatures are substantial and therefore result in an economically desirable product which may be readily utilized in various glass making applications.

The process of this invention comprises heating boric acid to a temperature in the range, of about 180°–220° C., preferably about 195° to 205° C., for a period of time sufficient to dehydrate the boric acid and form a molten glass containing about 80–90% by weight $B_2O_3$, preferably about 84–86% $B_2O_3$. The resultant molten glass is cooled to form a solid glassy product which may then be comminuted such as by milling in a hammer mill or roll crusher to give a particulate amorphous boric oxide-containing product which is essentially free from contamination by sodium, sulfates and other undesirable contaminants. The balance of the product (10–20%) is essentially all unremoved water.

Application Ser. No. 08/157,755, now U.S. Pat. No. 5,424,052, which is assigned to the assignee of the present application, describes a process for producing a similar boric oxide product with a slightly higher $B_2O_3$ content. In the procedure of the patent, the boric acid is heated at a higher temperature of about 220° to 275° C., and at such temperatures the reaction melt becomes very viscous and unpourable, having a viscosity of about 180,000 poises at 270° C. This results in a reaction mixture which is readily adapted to a continuous process using a moving belt on which the boric acid reactant is conveyed through a heating zone and dehydrated to boric oxide having about 85 to 92% $B_2O_3$.

In the process of the present application, the lower reaction temperatures produce a very fluid melt which can be readily conveyed through a reactor-mixer of the type described herein. At temperatures in the range of about 180° to 220° C., the molten reaction mixture is a fluid melt with a viscosity of about 5000 poises which can be continuously fed through a heated reactor-mixer in a relatively short period of time.

In a typical procedure according to this invention, boric acid is fed continuously into a reactor-mixer which is heated by the circulation of hot oil through a jacket which surrounds the reactor, the temperature of the oil being maintained by passing it through an external oil heater. The reaction mixture is maintained in a fluid state by control of the melt temperature in the range of about 180° to 220° C. and the composition in the range of about 80 to 90% by weight $B_2O_3$. The mixture is stirred and kneaded by mechanical means such as rotating blades or paddles, whereby the particulate boric acid fed into the reactor becomes quickly melted into the fluid mixture and is dehydrated. The extent of dehydration is controlled by control of the temperature and retention time within the reactor. The fluid mixture exits the reactor through a heated exit means and is fed directly to cooling means such as rotating chill rolls, producing a glass of the boric oxide product. The cooled glass can be fed into a variety of milling equipment to be ground into particulate material of the desired sizes.

Examples of suitable reactor-mixers for carrying out the process of this invention include a horizontal single-shaft mixer, such as a Discotherm mixer sold by LIST, Inc. and a horizontal twin-shaft intensive mixer such as a Kneadermaster CK-453 mixer from Patterson Industries or an AP-CONTI (All Phase Continuous) Mixer from LIST, Inc. These mixers utilize rotating blades mounted on or forming one or two or more horizontal shafts to efficiently mix or knead the reaction mixture as it is conveyed through the mixer. The rotating blades preferably scrape the sides of the reactor, providing efficient mixing and heat transfer throughout the reaction mixture as it moves through the reactor. Preferably, the apparatus is constructed of stainless steel, such as 316 stainless steel, so as to minimize any corrosion of the surfaces in contact with the hot reaction mixture. Boric acid can be fed into the top of such a mixer using a variable speed screw feeder. The level of the melt in the mixer can be controlled by a weir or similar mechanism or by careful control of the feed and discharge rates so as to assure that the bodic acid feed is always effectively mixed into the molten glass. Heating by means of hot oil which is heated electrically external to the mixer and circulated through a jacket surrounding the mixer as well as through the blades, provides good control of the temperature of the reaction mixture. The mixer speed and feed rate and the temperature of the heating oil can be adjusted to control the production rate. At higher mixer speeds, higher production rates are obtained through better heat transfer, better mixing of the feed into the melt and better release of water vapor from the melt. The best operating conditions and production rates are generally obtained by maintaining the temperature of the boric acid melt in the preferred range of about 195° to 205° C. This melt temperature generally can be obtained at a high rate of production with an oil temperature of about 280° to 300° C. Such a combination of conditions can provide good energy efficiency to the process.

The glassy boric oxide product is discharged through a valve which is heated so as to maintain the temperature of the melt in the valve at the same temperature as in the mixer. Preferably, an oil jacket is used to heat the valve and the moving parts are isolated as much as possible from the molten glass. Alternatively a heated twin discharge screw can be utilized in place of the valve for ease of operation.

The temperature of the off gas exiting the mixer is generally in the range of about 180°–190° C. and consists primarily of steam and boric acid. The boric acid in the off gas stream desublimes whenever and wherever the off gas is cooled below 180° C. Thus, metal surfaces in the off gas ducting can be kept free of boric acid by heating them above 180° C. or can be used to collect boric acid for reuse by cooling them to below 180° C. Preferably, the off gas from the mixer is directed to an apparatus such as a condenser which will both desublime boric acid and condense the steam at a temperature below 100° C. Preferably the walls of the condenser are continuously washed down in order to prevent plugging. The resulting aqueous solution may be collected for recovery of the contained boric acid.

The following examples illustrate the novel method of this invention.

EXAMPLE 1

Dehydration of Boric Acid in a Continuous Kneadermaster Mixer

A twin-shaft horizontal Patterson Kneadermaster mixer, having a working volume of 4.5 gallons and heat transfer surface area of 10.8 square feet was utilized for the melting process. The heat required for dehydration was supplied by circulating hot thermal fluid through both a jacket surrounding the mixer walls and through the interior of the hollow blades. The thermal fluid was heated by an electric oil heater which contained an integral temperature controller and pump to circulate the fluid.

The empty mixer was preheated by circulating thermal fluid at 240° C. for one-half hour. The mixer blades were set to a speed of 53 rpm using a variable speed controller. Boric acid was then fed in through the top of the mixer using a variable speed screw feeder at a rate of 30 pounds per hour. As the bodic acid dehydrated, a fluid melt formed in the mixer, and water vapor was removed as steam through a stack on top of the mixer. The off gas stream was drawn through a cyclone and a baghouse using a fan in order to trap a small quantity of volatilized boric acid before discharge of the off gas to the atmosphere. Gradually, the mixer was filled with melt to just below the height of the blades. The feed was then turned off and any unreacted boric acid was allowed to melt until a clear fluid melt was obtained. During this step, it was important to maintain the temperature of the thermal fluid at 240° C. and the melt at 195°–205° C. to avoid driving excess water out of the melt, thereby making it too viscous to easily discharge from the mixer.

After the filling operation was complete, a valve on the bottom of the mixer at the discharge end was opened. The valve was electrically heated, utilizing a temperature controller to prevent solidification of the exiting glass, by maintaining its temperature at 200° C., similar to the melt temperature in the mixer. The thermal fluid was then heated to 300° C. and the boric acid feed rate increased to 70 pounds per hour. The process was then operated continuously with the glass stream being removed from the mixer at a rate such that the level in the mixer was maintained. The stream was fed between two rotating horizontal hollow steel rollers six inches in diameter and 8.5 inches in length through which cold water was circulated. This served to both squeeze the stream into a sheet approximately $\frac{1}{16}$ inch thick and to solidify the sheet into a rigid glass. The glass sheet was removed from beneath the rollers using a conveyor belt. It was then fed to a mill and ground to about −30 mesh to produce a granular product containing 84.7% $B_2O_3$. A production rate of 40–45 pounds per hour of product was obtained.

EXAMPLE 2

Dehydration of Boric Acid in a Continuous Discotherm Mixer

A single-shaft horizontal mixer (List Inc. Discotherm B-6 mixer), having a working volume of 4.5 gallons and a heat transfer surface area of 7.2 square feet, was utilized for the melting process. The heat required for dehydration was supplied by circulating hot thermal fluid through the jacket and shaft of the mixer.

The empty mixer was preheated by circulating thermal fluid at 280° C. Boric acid was then fed at 64 pounds per hour using a precalibrated volumetric twin screw feeder mounted via a ranged 'Tee' to the mixer. The boric acid melt in the mixer was maintained at an average of about 210° C. by controlling the feed rate and temperature of the circulating thermal fluid. Vapors exited the mixer through a heated vapor dome. The level of melt in the mixer was controlled by a weir plate such that a minimum filling level of 50 percent was maintained. The melt overflowed the weir into a heated twin discharge screw running at 20 rpm, which conveyed it from the mixer into aluminum pans to cool. The product contained approximately 87% $B_2O_3$.

EXAMPLES 3–6

A series of tests were run at various thermal fluid temperatures, using the same equipment and procedures as in Example 1. In each of these experiments the empty mixer was preheated by circulating thermal fluid at 240° C., as in Example 1, and bodic acid was fed in at a rate of 30 pounds per hour to fill the mixer to just below the height of the blades. After the mixer was filled the feed was shut off while the initial charge of boric acid was melted. After a clear melt was achieved, the thermal fluid was held at 240° C. (Example 3) or heated to higher temperatures up to 300° C. The boric acid feed to the mixer was then resumed. A mixer speed of 53 rpm was used throughout this series of tests. In each case the bodic acid feed rate was gradually increased up to the maximum production rate which could be sustained at the given thermal fluid temperature. The limiting production rate was identified by the appearance of unreacted boric acid or metaboric acid in the melt as it discharged from the reactor, based on visual examination.

The results, shown in Table 1, indicate that the maximum production rate increases as the thermal fluid temperature is raised. As a result, variations in the melt temperature are relatively minor and extent of dehydration, as measured by the product $B_2O_3$ analysis, is fairly consistent.

TABLE 1

|  | Example | | | |
| --- | --- | --- | --- | --- |
|  | 3 | 4 | 5 | 6* |
| Thermal Fluid Temperature (C.°) | 240 | 260 | 280 | 300 |
| Melt Temperature (C.°) | 183 | 189 | 191 | 198 |
| Mixer Speed (rpm) | 53 | 53 | 53 | 53 |
| Maximum Production Rate (lb product/hr) | 13.4 | 29.5 | 37.5 | 38.7 |
| Product Analysis (% $B_2O_3$) | 83.1 | 83.5 | 84.1 | 84.7 |
| Energy Efficiency (% of Theoretical) | 31 | 49 | 48 | 47 |

*Average of several tests

EXAMPLE 7

The process was run using the same conditions as Example 1 except that the mixer speed was increased from 53 rpm to 98 rpm after the mixer was filled, the initial charge was melted and steady-state operation was beginning. A maximum production rate of 45 pounds of product per hour was achieved at this higher mixer speed. The feed rate of boric acid was 81 pounds per hour at this maximum production rate.

Various changes and modifications of the invention can be made and, to the extent that such variations incorporate the spirit of this invention, they are intended to be included within the scope of the appended claims.

What is claimed is:

1. A method for producing an amorphous boric oxide-containing product having from about 80 to 90% by weight $B_2O_3$, which comprises heating boric acid to a temperature in the range of from about 180° to 220° C. for a period of time sufficient to dehydrate said boric acid and form a molten glass containing about 80 to 90% by weight $B_2O_3$, and cooling said molten glass to form a solid glassy product.

2. The method according to claim 1 in which said glassy product is comminuted to form a particulate boric oxide product containing about 80 to 90% by weight $B_2O_3$.

3. The method according to claim 1 in which said boric acid is dehydrated in a heated reactor-mixer.

4. The method according to claim 3 in which said heating is applied by means of a heated fluid circulated through a jacket surrounding said reactor-mixer.

5. The method according to claim 3 in which said reactor-mixer is a horizontal single-shaft mixer.

6. The method according to claim 3 in which said reactor-mixer is a horizontal twin-shaft mixer.

7. The method according to claim 6 in which said reactor-mixer is a Kneadermaster mixer.

8. The method according to claim 1 in which said boric acid is heated to a temperature of about 195° to 205° C.

9. The method according to claim 1 in which said boric oxide product contains about vto 86% by weight $B_2O_3$.

10. A boric oxide product comprising about 80 to 90% by weight $B_2O_3$ and the balance essentially all water, produced by dehydration of boric acid according to the method of claim 1.

11. A boric oxide product according to claim 10 having about 84 to 86% by weight $B_2O_3$.

12. A continuous process for producing an amorphous boric oxide product containing about 80 to 90% by weight $B_2O_3$, which comprises feeding boric acid continuously into a reactor-mixer, mixing and heating said bodic acid in said reactor-mixer to a temperature in the range of about 180° to 220° C. for a period of time sufficient to dehydrate said boric acid and form a fluid molten glass containing about 80 to 90% by weight $B_2O_3$, discharging said fluid molten glass from said reactor-mixer through a heated exit means, cooling said molten glass to form a solid glassy product, and comminuting said glassy product to form a particulate amorphous boric oxide product containing about 80 to 90% by weight $B_2O_3$.

13. The process according to claim 12 in which said discharged molten glass is fed to rotating chill rolls to cool and solidify said molten glass.

14. The process according to claim 12 in which said bodic acid is heated by means of a heated fluid circulated through a jacket surrounding said reactor-mixer.

15. The process according to claim 12 in which said boric acid is heated to a temperature in the range of about 195° to 205° C.

16. The process according to claim 12 in which said boric oxide product contains about 84 to 86% by weight $B_2O_3$.

17. The process according to claim 12 in which said reactor-mixer is a horizontal single-shaft mixer.

18. The process according to claim 12 in which said reactor-mixer is a horizontal twin-shaft mixer.

19. A boric oxide product comprising about 80 to 90% by weight $B_2O_3$ and the balance essentially all water, produced by dehydration of boric acid according to the process of claim 12.

20. A boric oxide product according to claim 19 having about 84 to 86% by weight $B_2O_3$.

* * * * *